United States Patent
Giupponi et al.

(10) Patent No.: US 12,550,965 B2
(45) Date of Patent: Feb. 17, 2026

(54) WATERPROOF AND BREATHABLE FOOTWEAR

(71) Applicants: W. L. Gore & Associates GmbH, Putzbrunn (DE); W. L. Gore & Associati S.r.l., Verona (IT)

(72) Inventors: Andrea Giupponi, Verona (IT); Stane Nabernik, Putzbrunn (DE); Stefano Ranzato, Verona (IT)

(73) Assignees: W. L. Gore & Associates GmbH, Putzbrunn (DE); W. L. Gore & Associati S.r.l., Verona (IT)

( * ) Notice: Subject to any disclaimer, the term of this patent is extended or adjusted under 35 U.S.C. 154(b) by 0 days.

(21) Appl. No.: 18/236,494

(22) Filed: Aug. 22, 2023

(65) Prior Publication Data
US 2024/0057710 A1    Feb. 22, 2024

(30) Foreign Application Priority Data
Aug. 22, 2022 (EP) ................................. 22425037

(51) Int. Cl.
| | |
|---|---|
| *A43B 1/14* | (2006.01) |
| *A43B 1/10* | (2006.01) |
| *A43D 86/00* | (2006.01) |
| *B32B 3/28* | (2006.01) |
| *B32B 5/02* | (2006.01) |
| *B32B 7/12* | (2006.01) |

(Continued)

(52) U.S. Cl.
CPC .................. *A43B 1/14* (2013.01); *A43B 1/10* (2013.01); *A43D 86/00* (2013.01); *B32B 3/28* (2013.01); *B32B 5/022* (2013.01); *B32B 7/12* (2013.01); *B32B 25/14* (2013.01); *B32B 27/40* (2013.01); *B32B 2307/7265* (2013.01); *B32B 2437/02* (2013.01)

(58) Field of Classification Search
CPC ...... A43B 23/022; A43B 23/026; A43B 7/125
See application file for complete search history.

(56) References Cited

U.S. PATENT DOCUMENTS

| | | | | |
|---|---|---|---|---|
| 1,278,140 A | * | 9/1918 | Golden | A43B 7/125 36/46.5 |
| 1,289,662 A | * | 12/1918 | Clark | A43B 7/125 36/14 |

(Continued)

FOREIGN PATENT DOCUMENTS

| | | |
|---|---|---|
| DE | 3840087 A1 * | 11/1988 |
| DE | 20209669 U1 | 8/2002 |

(Continued)

OTHER PUBLICATIONS

European Search Report for EP Patent Application No. 22425037.3, Issued on Jan. 30, 2023, 8 pages.

*Primary Examiner* — Jillian K Pierorazio

(57) ABSTRACT

The present application relates to a waterproof and water vapour permeable footwear article comprising an upper, an insole, a sole, and a waterproof bridging tape; wherein the upper comprises an outer material and a waterproof and water vapour permeable membrane, wherein at least the top end of the waterproof bridging tape is attached to the waterproof and water vapour permeable membrane of the upper at the bottom perimeter edge of the upper and a method of making such a waterproof and water vapour permeable footwear article.

16 Claims, 7 Drawing Sheets

(51) Int. Cl.
  *B32B 25/14*  (2006.01)
  *B32B 27/40*  (2006.01)

(56) References Cited

U.S. PATENT DOCUMENTS

| | | | | |
|---|---|---|---|---|
| 5,505,011 | A * | 4/1996 | Bleimhofer | A43B 7/125 36/4 |
| 6,088,935 | A | 7/2000 | Pavelescu et al. | |
| 6,845,572 | B1 * | 1/2005 | Haimerl | A43B 7/125 36/12 |
| 2001/0049889 | A1 * | 12/2001 | Chen | A43B 7/125 36/55 |
| 2002/0040537 | A1 * | 4/2002 | Polegato Moretti | A43B 7/08 36/12 |
| 2003/0000111 | A1 * | 1/2003 | Basso | A43B 13/28 36/99 |
| 2005/0055843 | A1 * | 3/2005 | Morlacchi | A43B 7/125 36/44 |
| 2005/0210708 | A1 * | 9/2005 | Chen | A43B 7/125 36/55 |
| 2006/0248751 | A1 * | 11/2006 | Haimerl | A43B 9/00 36/83 |
| 2011/0167677 | A1 * | 7/2011 | Peikert | A43B 7/082 36/3 B |
| 2012/0151806 | A1 * | 6/2012 | Polegato Moretti | B29D 35/142 36/3 B |
| 2013/0232825 | A1 | 9/2013 | Wiener et al. | |
| 2013/0247414 | A1 * | 9/2013 | Bier | A43B 7/088 36/45 |
| 2014/0165422 | A1 * | 6/2014 | Pfister | D04B 21/16 36/45 |
| 2016/0000176 | A1 * | 1/2016 | Peikert | A43B 7/08 36/3 A |
| 2020/0037698 | A1 * | 2/2020 | Pierobon | A43B 7/125 |
| 2020/0046064 | A1 * | 2/2020 | Polegato Moretti | A43B 7/125 |
| 2020/0146390 | A1 | 5/2020 | Heidenfelder et al. | |
| 2020/0229534 | A1 * | 7/2020 | Polegato Moretti | A43B 13/32 |

FOREIGN PATENT DOCUMENTS

| | | |
|---|---|---|
| EP | 0916275 A2 | 5/1999 |
| EP | 1197158 A1 | 4/2002 |
| JP | 07-184703 A | 7/1995 |
| JP | 2002-172003 A | 6/2002 |
| JP | 2005-520611 A | 7/2005 |
| JP | 2006-512132 A | 4/2006 |
| JP | 2014-117610 A | 6/2014 |
| JP | 2020-527078 A | 9/2020 |
| KR | 10-2014-0135807 A | 11/2014 |
| WO | 2003/079839 A1 | 10/2003 |
| WO | 2019/015741 A1 | 1/2019 |
| WO | WO-2021164833 A1 * | 8/2021 ............ A43B 1/028 |

* cited by examiner

WATERPROOF AND BREATHABLE FOOTWEAR

CROSS-REFERENCE TO RELATED APPLICATION

This application claims priority to EP Application No. 22425037.3, filed Aug. 22, 2022, which is incorporated herein by reference in its entirety for all purposes.

FIELD OF THE INVENTION

The present invention relates to waterproof and water vapour permeable footwear articles comprising an upper which includes an outer material laminated to a waterproof and water vapour permeable membrane. The waterproof and water vapour permeable footwear article further comprises a waterproof bridging tape. Further disclosed is a method of manufacturing a waterproof and water vapour permeable footwear article.

BACKGROUND OF THE INVENTION

Waterproof and water vapour permeable footwear articles are used for a variety of purposes. Waterproof and water vapour permeable footwear articles are popular particularly because of durable waterproofness for activities such as outdoor sports and heavy duty work, for example in the field of fire safety, health work, police, machinery and defence where footwear articles usually are thicker and sturdier. Such footwear articles provide protection from elements such as water, fluids, mud and snow, whilst also providing durability and protection.

Of particular interest is a durable seal between the waterproof and water vapour permeable upper and the waterproof sole. There is therefore a need for waterproof and water vapour permeable footwear articles which are durably waterproof and water vapour permeable. In particular there is a need for sealing footwear articles during manufacture in the area between the waterproof and water vapour permeable upper and the waterproof sole.

An object of the present application has therefore been to provide a waterproof and water vapour permeable footwear article, in particular in the field of heavy duty applications, which provides reliable waterproofness and water vapour permeability. A further object of the present application has been to durably prevent ingress of water whilst keeping the footwear article water vapour permeable to allow sweat to dissipate to the outside of the footwear article. In addition, it has been object of the present application to optimise the manufacturing process and to reduce the use of complex materials.

SUMMARY OF THE INVENTION

A waterproof and water vapour permeable footwear article is provided comprising an upper, an insole, a sole and a waterproof bridging tape. The upper comprises an outer material and a waterproof and water vapor permeable membrane. The waterproof and water vapour permeable membrane is laminated to the surface of the outer material facing the inside of the waterproof and water vapour permeable footwear article. The waterproof and water vapour permeable membrane of the upper may be in contact with the outer material. At least the top end of the waterproof bridging tape is attached to the waterproof and water vapour permeable membrane of the upper at the bottom perimeter edge of the upper and on the surface of the waterproof and water vapour permeable membrane that faces the inside of the waterproof and water vapour permeable footwear article. The waterproof bridging tape may comprise a waterproof carrier layer which is covered on at least one surface with an adhesive layer. The waterproof bridging tape may comprise a waterproof carrier layer which is covered on both opposing surfaces with an adhesive layer.

The bottom end of the waterproof bridging tape may be attached to the insole. The waterproof bridging tape may be attached to the insole with adhesive or attached to the insole with a seam.

The waterproof and water vapour permeable footwear article may further comprise a nonwoven material. A first end of a nonwoven material may be attached to the bottom end of the waterproof bridging tape. If the waterproof and water vapour permeable footwear article further comprises a liner, the first end of the nonwoven material may be attached to the bottom ends of both the waterproof bridging tape and the liner. Preferably, the nonwoven material is attached to both the waterproof bridging tape and the liner by a single seam. In a further embodiment, the first end of the nonwoven material may be attached to the bottom end of the liner. In a further embodiment, the first end of the nonwoven material may be attached to the bottom end of the upper. The nonwoven material may be attached to the upper, liner and/or waterproof bridging tape with a seam. When the nonwoven material is attached to the upper, the waterproof bridging tape is attached on the inside of the waterproof and water vapour permeable footwear article such that it covers the seam connecting the nonwoven material to the upper. In this embodiment the waterproof bridging tape may further extend beyond the second end of the nonwoven material. The bottom end of the waterproof bridging tape may be attached to the insole. The seam which attaches the nonwoven to any other component of the waterproof and water vapour permeable footwear article is at least covered by the waterproof bridging tape, the sole cement, the protective layer or the injected sole polymer depending on the respective embodiment. In any case the seam is rendered waterproof.

The second end of the nonwoven material may be attached to the insole. The nonwoven material may be attached to the insole with a seam. The nonwoven material may be attached to the insole with an adhesive. Attachment of the nonwoven material to the insole may differ in different areas of the footwear article. For example, attachment of the nonwoven material in the toe area may be by using adhesive while in the heal area a seam may be used or vice versa.

The footwear article may further comprise a protective layer, preferably a rubber layer. The protective layer may comprise polyurethane. The protective layer may be located on the outside of the footwear article. The protective layer may be attached to the outside of the bottom perimeter of the upper and to the waterproof bridging tape. The protective layer may be attached to the waterproof bridging tape. When a nonwoven material is present the protective layer may further be attached to the nonwoven material with sole cement or adhesive.

The waterproof bridging tape may comprise a carrier layer which is covered on at least one surface with an adhesive. Both sides of the waterproof bridging tape may be covered by an adhesive. The carrier layer is waterproof. The carrier layer may comprise a polymeric material. The polymeric material may comprise a polyurethane. The carrier layer may be a waterproof and water vapour permeable membrane. The polymeric material may be a waterproof polymeric layer. The carrier layer may be a waterproof and water vapour permeable membrane as discussed below with regard to the upper and the liner.

The insole of the footwear may be a lasting board or a Strobel board.

The upper may further comprise at least one backing layer. The backing layer is located on the inside facing surface of the waterproof and water vapour permeable membrane. The backing layer may be a textile layer or an open mesh material. The textile layer or the open mesh material may be laminated to the waterproof and water vapour permeable membrane. The textile layer may be a knit or a woven.

The footwear article may further comprise a liner. The liner is located on the inside of the upper. The liner may comprise at least one textile layer. The liner may comprise at least a textile layer and a waterproof and water vapour permeable membrane. The liner may be a laminate comprising a waterproof and water vapour permeable membrane sandwiched between two textile layers. The liner may be in the form of a bootie. At the bottom the bootie may comprise a different material than at the sides of the bootie. At the bottom the liner bootie may be reinforced with a different material. When the liner is in the form of a bootie the carrier layer of the waterproof bridging tape is preferably covered by adhesive on only one surface. When the liner is not in the form of a bootie the carrier layer of the waterproof bridging tape preferably is covered by adhesive on both opposing surfaces. When the liner is not in the form of a bootie and when there is a textile layer facing the outside of the waterproof and water vapour permeable footwear article, this textile layer preferably has an open structure, such as for example a knit, a woven, or a mesh. The mesh may be made from multifilament materials or monofilament materials.

The waterproof and water vapour permeable footwear article may further comprise a protective toe cap. The protective toe cap may be located between the upper and the liner.

Different embodiments of the present invention may be applied to the toe region, the heel region and the rest of the footwear article.

The waterproof and water vapour permeable footwear article may further comprise a net band. The net band may be attached to the upper and a Strobel board. The net band may be attached to the upper and the Strobel board with seams. A bridging tape may be attached over the net band. The bridging tape may be attached to the net band over the whole length of the net band. The bridging tape may be attached over the net band on the surface of the net band that is facing the inside of the footwear article. The bridging tape may also overlap the seam between the upper and net band. The bridging tape may overlap the seam between the upper and the net band and at least a part of the inside facing surface of the upper. The bridging tape may contact the waterproof and water vapour permeable membrane of the upper on the inside facing surface of the footwear article. The edge of the bridging tape 70 and the edge of the net band 200 which is not sewn to the upper 40 may be coterminous. The coterminous edges of the bridging tape and the net band may be attached to the strobel board. The coterminous edges of the bridging tape and the net band may be attached to the strobel board by a seam. The seam is preferably a Strobel seam. The net band may be attached to the bridging tape along the full length of the net band. The net band may be attached to the bridging tape by the adhesive layer of the bridging tape. The net band may extend only horizontally. The net band may extend horizontally and vertically. The sole material may be injected over the footwear article. The injected sole material may cover the seam between the upper and the net band on the outside facing surface of the footwear article. The adhesive layer of the bridging tape may contact the net band, the seam between the net band and the upper and the waterproof and water vapour permeable membrane of the upper.

A method for making a footwear article is further provided which comprises
  providing an upper having at least one outer layer and a waterproof and water vapour permeable membrane laminated to the outer layer on the surface facing the inside of the footwear article, an insole, a sole and a waterproof bridging tape,
  optionally providing a liner material which optionally comprises at least one waterproof and water vapour permeable membrane,
  attaching the top end of the waterproof bridging tape to the waterproof and water vapour permeable membrane of the upper at the bottom perimeter edge of the upper on the surface of the waterproof and water vapour permeable membrane that faces the inside of the footwear article.

The method may further include the step of attaching the bottom end of the waterproof bridging tape and/or the liner to the insole or to a nonwoven material.

The method may further include the step of attaching the nonwoven material to the insole.

The method may further include the step of cementing or injecting a sole.

A method for making a waterproof and water vapour permeable footwear article is provided which comprises
  providing an upper having at least one outer layer and a waterproof and water vapour permeable membrane laminated to the outer layer on the surface facing the inside of the footwear article, an insole, a sole and a waterproof bridging tape,
  optionally providing a liner material which optionally comprises at least one waterproof and water vapour permeable membrane,
  attaching one edge of a net band to the upper with a seam,
  applying a bridging tape over the total length of the net band, over the seam between the net band and the upper and at least a portion of the upper on the surface facing the inside of the footwear article,
  attaching the opposite edge of the net band and the bridging tape to a strobel board with a seam.

The method may further include the step of injecting a sole. The method may further include injecting the sole material over the seam between the upper and the net band on the outside facing surface of the footwear article.

The method may further comprise the edges of the bridging tape and the net band that are attached to the strobel board to be coterminous.

BRIEF DESCRIPTION OF THE DRAWINGS

The features of the invention will be better understood by anyone skilled in the art from the following description and accompanying drawings, provided by way of nonlimiting examples, in which.

DETAILED DESCRIPTION

Figure 1:
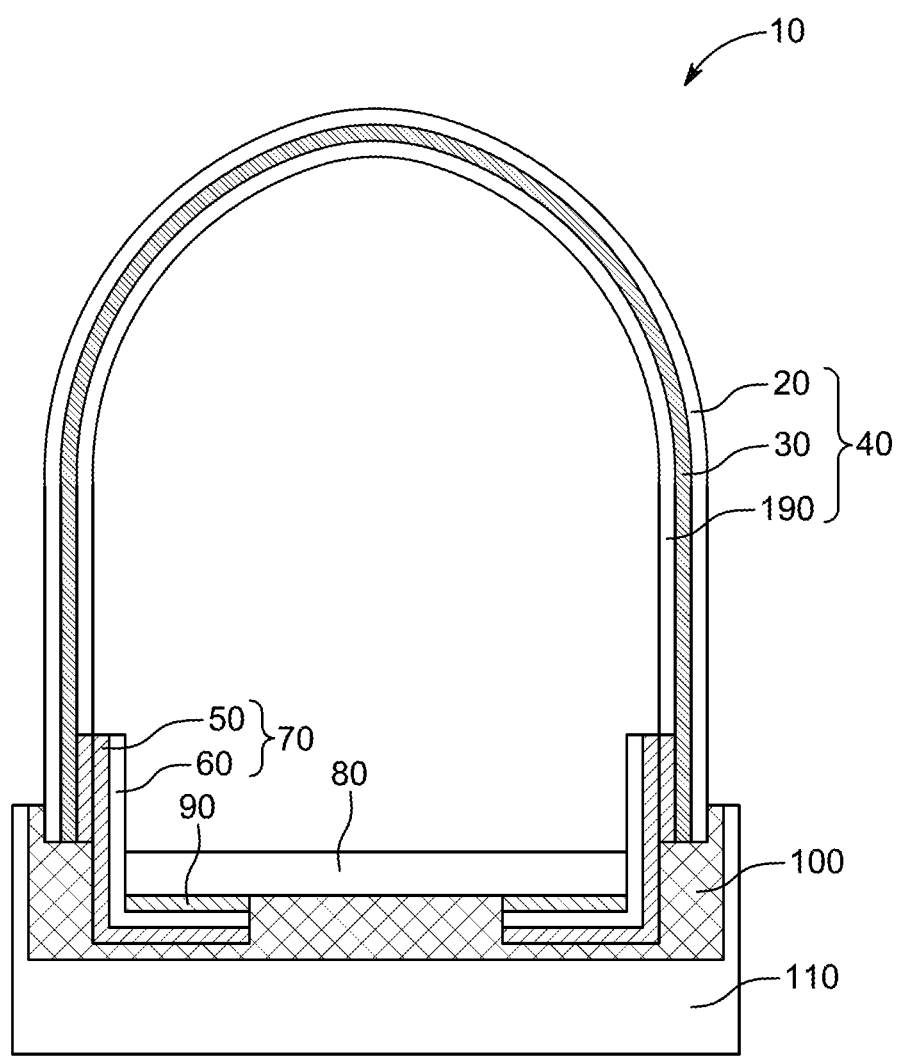
FIG. 1 is a cross-sectional view of waterproof footwear article comprising a waterproof bridging tape and a backing layer.

While the various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "footwear" or "footwear article" refers to outer coverings for feet such as shoes, boots, sneakers and the like.

The invention relates to waterproof and water vapour permeable footwear articles and methods for making said footwear. The waterproof and water vapour permeable footwear article includes an upper, an insole, a sole, and a waterproof bridging tape. The waterproof bridging tape is not a traditional sealing carrier or waterproof gasket which typically comprises a textile carrier layer. The waterproof bridging tape of the present application comprises a waterproof carrier layer and at least one surface of this waterproof carrier layer is covered by an adhesive layer. Both opposing surfaces of the carrier layer may be covered by an adhesive layer. The carrier layer may be made of a polymeric material. The adhesive layers are reactivatable, for example by pressure and/or by heat. The polymeric material of the carrier layer may be a natural polymer such as rubber or a synthetic polymer such as polyimide, ethylene-vinyl acetate, polyvinyl chloride, polyethylene, fluoropolymer (such as polytetrafluoroethylene), polyester or thermoplastic polyurethane. The adhesive may be a polyurethane (PU) adhesive. The carrier layer may be a waterproof and water vapour permeable membrane as discussed in this application. The carrier layer may be reinforced by laminating a non-woven on one or on both sides.

The upper comprises an outer material and a waterproof and water vapour permeable membrane which are laminated. The upper may further comprise at least one textile layer between the outer material and the membrane. On the side of the waterproof and water vapour permeable membrane which faces the inside of the footwear article an open mesh material may be laminated. Open mesh in this regard means any material that allows for the adhesive of the waterproof bridging tape to fully penetrate the open mesh material. The outer material and the waterproof and water vapour permeable membrane may be laminated to each other. The waterproof and water vapour permeable membrane of the upper may be comprised in a laminate having 2, 3 or 4 layers (including the waterproof and water vapour permeable laminate).

The outer material can be made from any material that is typically used for this purpose. Examples include leather, synthetic leather and textile fabrics. Typically, textile fabrics comprise polyester, polypropylene, polyamide (e.g. nylon) or cotton. The outer layer may be a laminate comprising two or more layers or the above materials.

Textile fabrics may comprise filaments, such a monofilaments, or fibres, or any mixtures thereof. Fibres include natural and synthetic fibres and any mixtures thereof. Natural fibres include cellulosic types such as cotton, hemp or linen; animal fibres such as silk, angora, sheep's wool, alpaca, cashmere, mohair and any combination thereof.

Synthetic fibres include fibres based on acrylic polymers, polyesters, polyolefins, polyurethanes, polyamides and any combination thereof. The textile fabrics may be knit fabrics, woven fabrics, or non-woven fabrics. The fabrics may stretch. The stretchiness may be due to the use of stretchable yarns or fibres, made e.g. from elastomers. The stretchiness may be due to the way the yarns or fibres are knitted or woven.

As used herein, the term "knit" refers to any fabric or textile having a configuration with at least one yarn, thread or monofilament turned into consecutive rows of loops, called loop stitches. As each row progresses, a new loop is pulled through an existing loop. The active loop stitches are held on a needle until another loop can be passed through them.

In the process of knitting a fabric is formed by the intermeshing of loops of yarn, yarns or monofilaments. Each thread of yarn or monofilament follows a meandering path, called course, thus forming loops symmetrically to the meandering path of the thread. When one loop is drawn through another, loop stitch is formed. Loop stitches may be formed in horizontal (weft knitting) or vertical direction (warp knitting). A sequence of loop stitches in which each stitch is suspended from the next is called a wale.

Weft knitting is a method of forming a fabric in which the loops are made in horizontal way from a single yarn or monofilament, and intermeshing of loops takes place in a crosswise direction, i.e. the wales are perpendicular to the course of the yarn or monofilament. Weft knitting may be knit using only one yarn or monofilament, or using a multiplicity of yarns or monofilaments.

Warp knitting is a method of fabric forming in which the loops are made in a vertical way along the length of the fabric from each warp yarn or monofilament, and intermeshing of loops takes place in a lengthwise direction. In warp knitting, the wales and courses run parallel. One yarn or monofilament is required for each wale, thus numerous ends of yarns or monofilaments are being fed simultaneously to individual needles placed in a lateral direction.

Preferred knit material comprise fibres made from polyamide, such as nylon (e.g. PA6 or PA6.6) or polyester.

"Woven" refers to a fabric or textile formed by weaving. Weaving is a process of fabric forming by the interlacement of warp and weft yarns. Both warp and weft yarns run essentially straight and parallel to each other, either lengthwise (warp) or crosswise (weft).

Nonwoven are typically defined as sheet or web structures where fibres or filaments are entangled mechanically, thermally or chemically. Fibres are laid out in the form of a sheet or web, typically in a random configuration, and then bound either mechanically, such as by needle punching or hydroentangling, or chemically by application of a binder onto the sheet or web, or thermally by melting the fibres or filaments at least partially for bonding with or without a binder present.

In embodiments the upper may be a laminate comprising four layers. An outermost layer of this laminate may be made of microfibres. This outermost layer may be laminated to a nonwoven layer. On the surface opposite to the microfibre layer the nonwoven layer may be laminated to a waterproof and water vapour permeable membrane. As a fourth layer a textile layer may be laminated on the surface of the waterproof and water vapour permeable membrane that is opposite from the nonwoven layer. This layer is facing the inside of the footwear in the upper. This layer may be an open mesh material such as a knit. The open mesh structure allows for the adhesive of the waterproof bridging tape to penetrate through the textile layer onto the waterproof and water vapour permeable membrane. Preferably the microfibres are made from polyamide or polyurethane. Preferably the nonwoven layer is made from polyester or polyamide, for example nylon.

In embodiments, the outer layer may have been treated to be durable water repellent (DWR). DWR is a treatment of coating, immersing or spraying a hydrophobic agent to fabrics to render them water-resistant or hydrophobic. Preventing the fabric from becoming saturated with water avoids reduction of the breathability of the functional layer.

The waterproofness of footwear may be determined by use of the Centrifuge test described in U.S. Pat. No. 5,329,807, and incorporated by reference herein in its entirety. The centrifuge tests may be carried out for 30 minutes. The footwear article is considered to be waterproof if no leakage is seen after 30 minutes.

The water vapour permeability of footwear may be assessed in accordance with the determination of the Whole Boot Moisture Vapor Transmission Rate Test in accordance with the Department of Defense Army Combat Boot Temperate Weather Specifications. The specifications are as follows:

Whole Boot Water Vapour Permeability

The boot vapour permeability test shall be designed to indicate the Moisture Vapor Transmission Rate (MVTR) through the test sample by means of a difference in concentration of moisture vapor between the interior and the exterior environment.

Apparatus a. The external test environment control system shall be capable of maintaining 23 (±1) ° C. and 50%±2% relative humidity throughout the test duration.
b. The weight scale shall be capable of determining the weight of test samples filled with water to an accuracy of (±0.01) gram.
c. The water holding bag shall be flexible so that it can be inserted into the test sample and conform to the interior contours; it must be thin enough so that folds do not create air gaps; it must have much higher MVTR than the footwear product to be tested; and it must be waterproof so that only moisture vapor contacts the interior of the footwear product rather than liquid water.
d. The internal heater for the test sample shall be capable of controlling the temperature of the liquid water uniformly in the test sample to 35 (±1) ° C.
e. The sealing method around the collar of the test sample shall be impervious to both liquid water and water vapor.

Procedure a. Place sample in test environment and condition for at least 12 hours.
b. The heating device is inserted into the water holding bag and the complete assembly is then placed into the test sample opening and filled with water to a height of 5 cm measured from inside sole.
c. Seal opening around the collar with plastic wrap around the top of the footwear and tape over using packaging tape.
d. Heat water in test sample to 35° C.
e. Weigh test sample and record as Wi.
f. Hold temperature in test sample after weighing for a minimum of 4 hours.
g. After a minimum of 4 hours, reweigh test sample. Record weight as Wf and test duration as Td.
h. Calculate MVTR of the test sample in grams/hour from the equation below: MVTR=(Wi−Wf)/Td.

This test is in accordance with ASTM D8041 (2016).

For example, for a low ankle shoe of European shoe size 42, the footwear may be considered breathable if above calculated value is above 1.5 grams/hour. For larger or smaller shoe sizes, said limit value may be extrapolated in accordance with the increased I decreased surface area of the shoe.

The waterproof and water vapour permeable membrane is considered to have waterproof characteristics when the requirements specified in DIN EN 343 (2010) are met, i.e. a test of the liquid water resistance with respect to hydrostatic water pressure according to EN 20 811 (1992) yields a liquid water resistance Wp of 8000 Pa, or more.

Water vapor permeability of the waterproof and water vapour permeable membrane is tested and defined in EN ISO 15496, also known as the "Cup Test". A 20 cm×20 cm or a circular ø 100 mm sample of the waterproof and water vapour permeable membrane is placed onto a container containing water and covered with a water vapor permeable and waterproof membrane. Then a cup containing potassium acetate and being covered by the same membrane is placed on the sample. Water vapor passes through the waterproof and water vapour permeable membrane into the cup, whose weight increase is then determined. The waterproof and water vapour permeable membrane is considered water vapor permeable or breathable if the water vapor permeability is greater than or equal to 0.01 g/(Pa m2 h). If the required size of the sample cannot be obtained, a smaller sample may be used for the measurement using a smaller cup containing half the amount of potassium acetate specified in the Norm, i.e. 50 g instead of 100 g and mixed with 15.6 g of water. The terms water vapor permeability and breathability are used interchangeably herein.

Non-limiting examples of suitable synthetic polymer membranes include polyurethanes, polytetrafluoroethylene (PTFE), expanded polytetrafluoroethylene (ePTFE), polyvinylidene fluoride (PVDF), fluorinated ethylene propylene (FEP), perfluoroalkoxy alkane (PFA), modified polytetrafluoroethylene polymers, tetrafluoroethylene (TFE) copolymers, polyalkylenes such as polypropylene and polyethylene, polyether sulfone (PES), polyesters, poly (p-xylylene) (ePPX) as taught in U.S. Patent Publication No. 2016/0032069, porous ultra-high molecular weight polyethylene (eUHMWPE) as taught in U.S. Pat. No. 9,926,416 to Sbriglia, U.S. Patent Application No. 2021/0317276 to Bell, PCT Patent Application No. 2020/28331 to Bell, porous ethylene tetrafluoroethylene (eETFE) as taught in U.S. Pat. No. 9,932,429 to Sbriglia, porous polylactic acid (ePLLA) as taught in U.S. Pat. No. 7,932,184 to Sbriglia, et al., porous vinylidene fluoride-co-tetrafluoroethylene or trifluoroethylene [VDF-co-(TFE or TrFE)] polymers as taught in U.S. Pat. No. 9,441,088 to Sbriglia and copolymers and combinations thereof.

The waterproof and water vapour permeable membrane may comprise at least one of expanded polytetrafluoroethylene (ePTFE), expanded polyethylene, expanded polypropylene, expanded polyolefins, polyurethane, polyester and copolyether ester, polyether, expanded polyether, polyamide (PA), copolyether amides and polyacrylate, or composites or multilayer laminates thereof. The waterproof and water vapour permeable membrane may be made of a fluoropolymer, particularly made of microporous expanded polytetrafluoroethylene (ePTFE).

The microporous polytetrafluoroethylene waterproof and water vapour permeable membrane may be a membrane of expanded polytetrafluoroethylene as taught in U.S. Pat. Nos. 3,953,566 and 4,187,390. Such membranes of expanded polytetrafluoroethylene are present in commercially available fabrics from W. L. Gore and Associates, under the tradename GORE-TEX® fabric. The water vapor permeable and waterproof membrane may be composed of a polyurethane coated microporous expanded polytetrafluoroethylene membrane made substantially according to the teachings of U.S. Pat. Nos. 4,194,041 and 4,942,214 assigned to W.L. Gore and Associates, Inc, in Elkton, Md. A further support material such as a knitted textile on one or both sides of the membrane may be present.

In embodiments, the waterproof and water vapour permeable membrane comprises a laminate of a membrane and a support layer or a membrane that is sandwiched between two support layers. The support layers may be textile layers as discussed above with respect to the outer layer. A support layer on the surface of waterproof and water vapour permeable membrane facing the inside of the waterproof and water vapour permeable footwear article may only be an open mesh material or a textile layer. Textile layer and open mesh material on the inside facing side means any material that allows for the injected polymeric material of the sole or the adhesive of the waterproof bridging tape to be able to fully penetrate the open mesh material or textile layer. The textile layer is preferably a knit or a woven.

The waterproof and water vapour permeable membrane may be present in the total length of the upper. Alternatively, the waterproof and water vapour permeable membrane may only be present in the area of the upper that surrounds the foot of the wearer, for example from the bottom of the foot to the area that surrounds the ankle of the wearer but not further. The outer material and the waterproof and water vapour permeable membrane may be coterminous at their respective bottom ends. This means that neither the waterproof and water vapour permeable membrane nor the outer material may extend beyond the other at the bottom end. The waterproof and water vapour permeable membrane may contact the outer material.

The insole may be made of any suitable material such as for example bonded leather, synthetic fabrics, thermoplastic polymers, fibreboard or rubber. The insole may be lasting board or a strobel board. A lasting board may have a higher stiffness and hardness than a strobel board. A strobel board is typically a textile material to enable stitching of the waterproof bridging tape, the nonwoven material and/or the liner to the strobel board.

Typical lasting adhesives such as hotmelt or pressure sensitive adhesives can be used, for example co-polyester or polyamide hotmelt adhesives or polyurethane.

The sole can be made of a single block that is attached by adhesive or cementing. To obtain high abrasion resistance and sole stability, materials can include for example rubber or polymers, such as for example polyurethane.

Alternatively, the sole may be made from a polymeric material such as polyurethane, thermoplastic polyurethane (TPU) or ethylene vinyl acetate (EVA) and injected over the bottom of the footwear construction that is assembled on the last.

At the end of the manufacturing process a footbed may be placed into the footwear article. The footbed may be made from material that cushions the foot of the wearer and provides a better fit and further thermal insulation.

In embodiments, the footbed may comprise two layers of material. The bottom layer facing the sole may be made from for example polyurethane (PU) foam, ethylene-vinyl acetate (EVA), polyethylene (PE) foams. The upper layer facing the foot of the wearer may be made from any of the materials disclosed for the inner layer. In embodiments, the upper layer may be made from the same material as the inner layer of the footwear article.

The footbed may be removable and not be attached to the insole and/or inner layer.

FIG. 1 shows a waterproof and water vapour permeable footwear article 10 comprising an upper 40, an insole 80, a sole 110, and a waterproof bridging tape 70. The upper comprises an outer material 20, a waterproof and water vapour permeable membrane 30 and a backing layer 190. The top end of the waterproof bridging tape 70 is attached to the backing layer 190 of the upper 40. The backing layer 190 comprises a mesh or a textile layer with an open structure such as a knit or a woven. The adhesive of the adhesive layer 50 of the waterproof bridging tape 70 penetrates through the backing layer 190 and therefore forms a bond with the waterproof and water vapour permeable membrane 30 of the upper 40 at the bottom edge of the upper 40. The waterproof bridging tape further comprises a carrier layer 60. The bottom end of the waterproof bridging tape 70 is attached to the underside of the insole 80 by lasting adhesive 90. The lasting adhesive 90 attaches the carrier layer 60 of the waterproof bridging tape 70 to the insole 80. A sole 110 is either cemented onto the lasted footwear 10 using sole cement 100 or injected over the last. FIG. 1 shows the cemented embodiment. Preferably the sole material covers partly the bottom end of the outside of the upper 40.

The side of the waterproof waterproof bridging tape 70 where the adhesive layer 50 is located is facing the waterproof and water vapour permeable membrane 30 of the upper 40 and the sole 110 (if the sole is injected) or the sole cement 100 (if the sole is cemented). A waterproof seal is provided as the waterproof and water vapour permeable membrane 30, the waterproof bridging tape 70 and the sole 110 which all are waterproof are bonded together by waterproof adhesive (adhesive layer 50 of the waterproof bridging tape 70, sole cement 100 and/or injected sole polymer 110).

Figure 2:
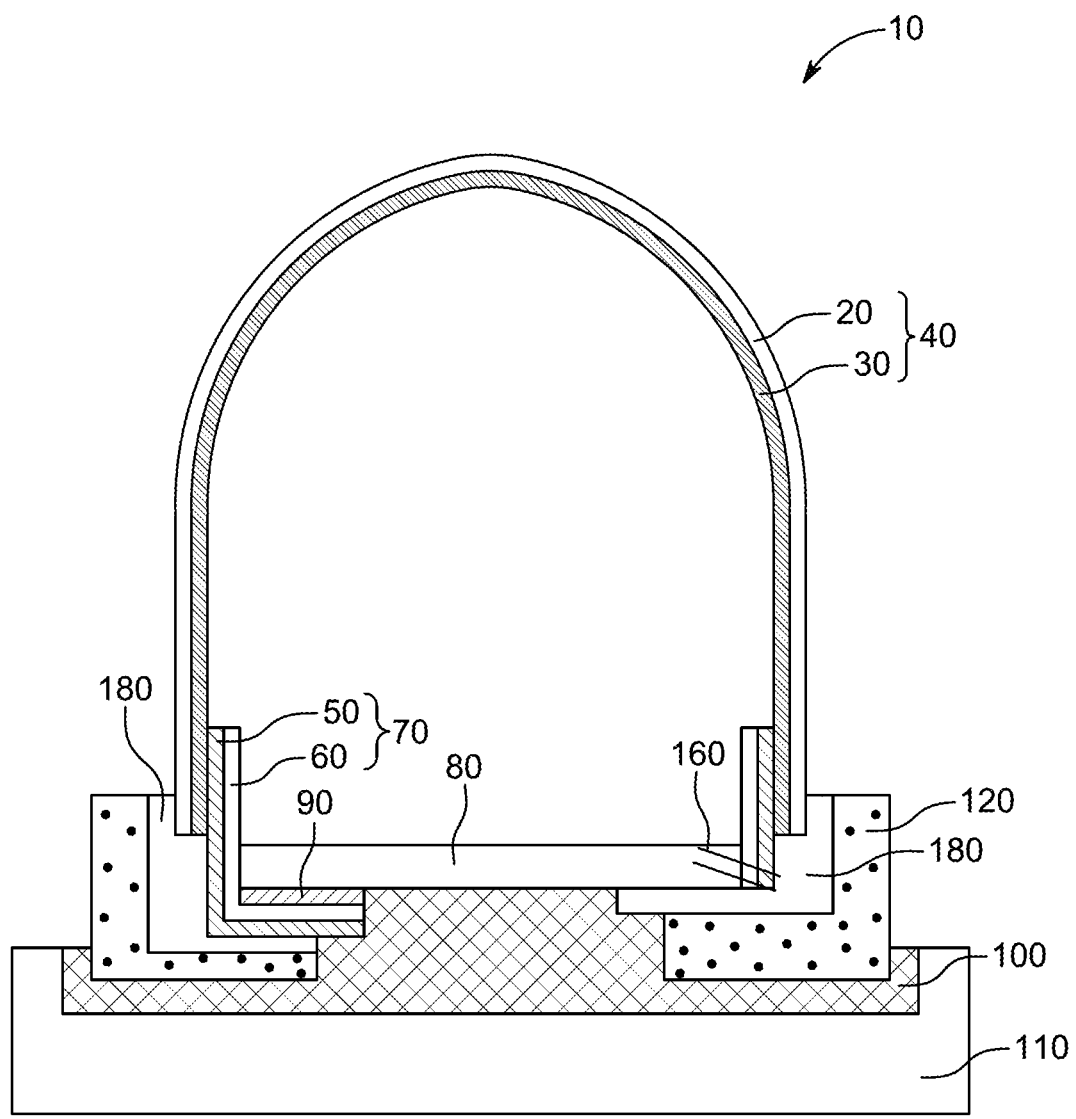
FIG. 2 is a cross-sectional view of waterproof footwear comprising a waterproof bridging tape and a protective layer.

Shown in FIG. 2 is a footwear article 10 which further comprises a protective layer 120. The left hand side of FIG. 2 shows a lasted embodiment while the right hand side shows a strobeled footwear article 10. In the lasted embodiment the protective layer 120 is attached to the bottom end of the outside of the upper 40 and to the waterproof bridging tape 70. The protective layer 120 is waterproof and provides further mechanical strength and in addition enhances waterproofness of the footwear article 10. In addition, the protective layer 120 further reduces the amount of upper material that needs to be used.

In the strobeled embodiment shown on the right hand side of FIG. 2, the top end of the waterproof bridging tape 70 is attached to the waterproof and water vapour permeable membrane and the bottom end of the waterproof bridging tape 70 is attached to the insole 80 with a seam 160. As in the lasted embodiment, the protective layer is glued to the bottom end of the upper 40 and then pulled around the insole 80 to which the protective layer 120 is attached with adhesive 180. The sole 110 is then either cemented or injected.

Figure 3:
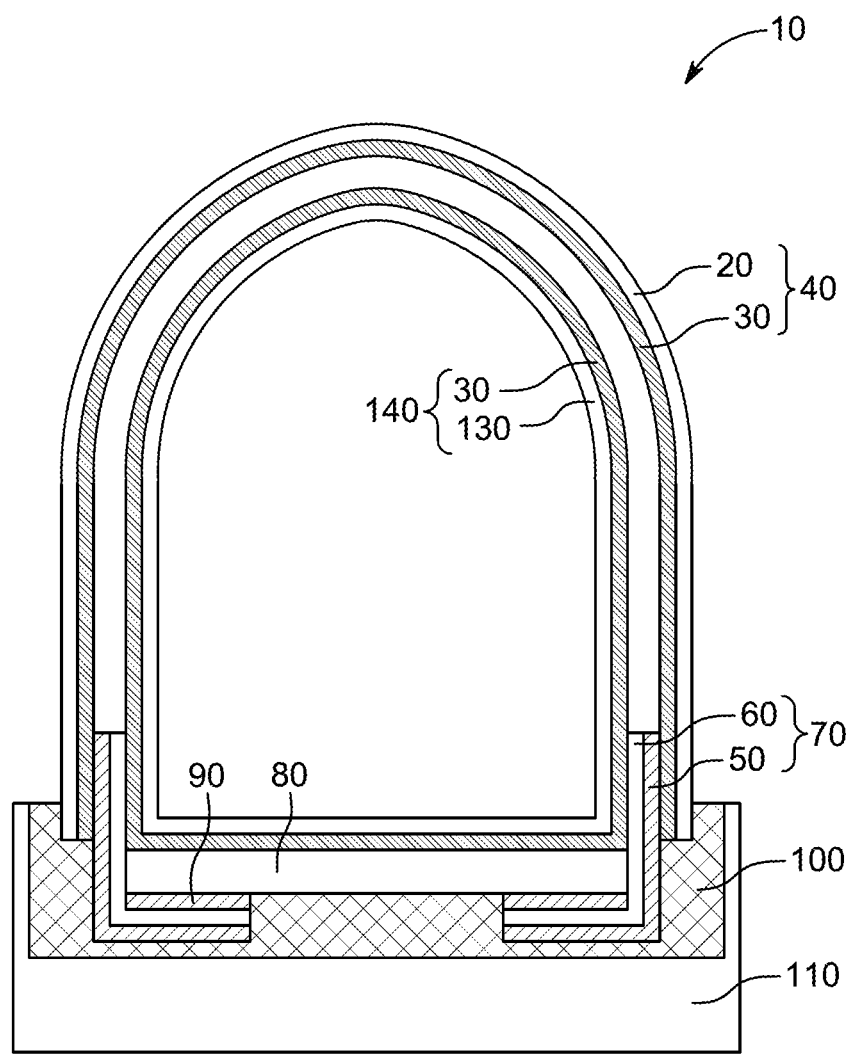
FIG. 3 is a cross-sectional view of waterproof footwear comprising a waterproof bridging tape, a protective layer and a liner bootie.

Turning to FIG. 3, described herein is a footwear article 10 as shown in FIG. 1 which further comprises a liner 140 in the form of a bootie. The liner 140 forms a bootie which is hung in the upper. The liner material may be made from one material e.g. a textile that is sewn into a bootie or may be made from several different materials. The liner 140 in FIG. 3 includes one layer of a waterproof and water vapour permeable material 30, such as a waterproof and water vapour permeable membrane. Whilst FIG. 3 shows a two layer liner 140, the liner 140 may be made from a three layer laminate with the waterproof and water vapour permeable membrane 30 being sandwiched between to textile layers 130. Preferably the textile layers are both knits.

Figure 4:
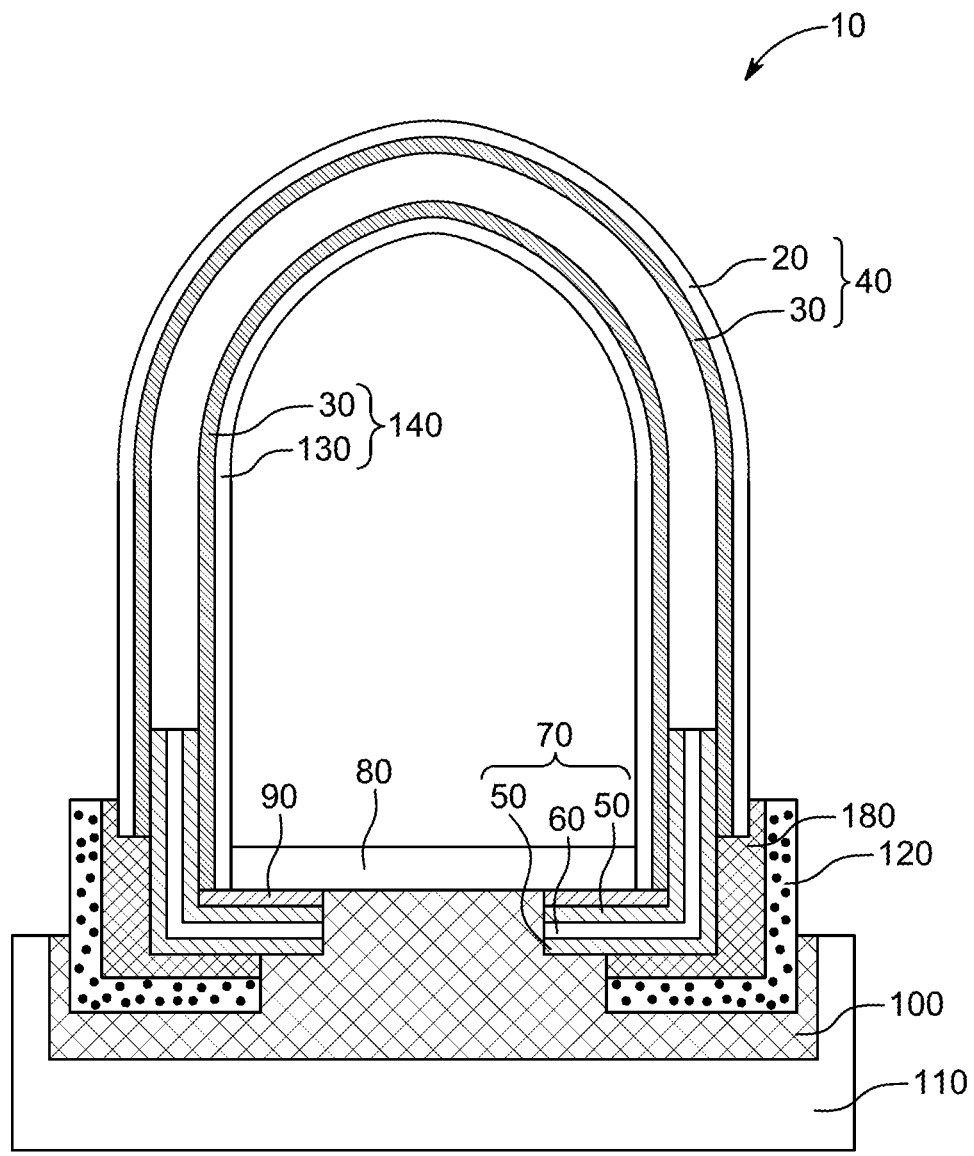
FIG. 4 is a cross-sectional view of waterproof footwear article comprising a waterproof bridging tape, a protective layer and a liner.

Alternatively, the liner 140 may not be formed as a bootie. This embodiment is shown in FIG. 4. The waterproof and water vapour permeable footwear article 10 of FIG. 4 comprises a protective layer 120, an upper 40, a waterproof bridging tape 70, an insole 80 and a sole 110. The waterproof bridging tape 70 comprises a carrier layer 60 which carries adhesive layers 50 on both surfaces. The top end of the waterproof bridging tape 70 is sandwiched between the bottom ends of the waterproof and water vapour permeable membranes of the upper 40 and the liner 140. The strong bond between the waterproof carrier layer 60 of the waterproof bridging tape 70 with the waterproof and water vapour permeable membranes of the upper 40 and the liner 140 seals the footwear article 10 together with the waterproof sole 110 which is either injected or cemented. FIG. 4 shows the cemented embodiment where sole cement 100 is used to attach the sole 110. In an injected embodiment both areas indicated at 100 and 110 are formed by injected sole polymeric material. The liner 140 is shown as a two layer liner, however, in further embodiments the liner 140 may not comprise a waterproof and water vapour permeable membrane and only comprise at least one textile layer or the liner may be a three layer laminate with a waterproof and water vapour permeable membrane sandwiched between two textile layers. Further, instead of lasting the waterproof bridging tape 70 to the insole 80, the waterproof bridging tape may be attached to the insole 80 with a seam.

In embodiments described herein, the footwear article 10 comprises an upper 40, an insole 80, a nonwoven material 150, a sole 110, and a waterproof bridging tape 70. The footwear article 10 may further comprise at least one protective layer 120. In addition, the footwear article 10 may comprise a liner 140. The upper 40 comprises at least an outer material 20 and a waterproof and water vapour permeable membrane 30. Optionally the upper 40 further comprises a mesh or a nonwoven layer such as a knit or woven on the inside facing side of the waterproof and water vapour permeable membrane 30.

Figure 5:
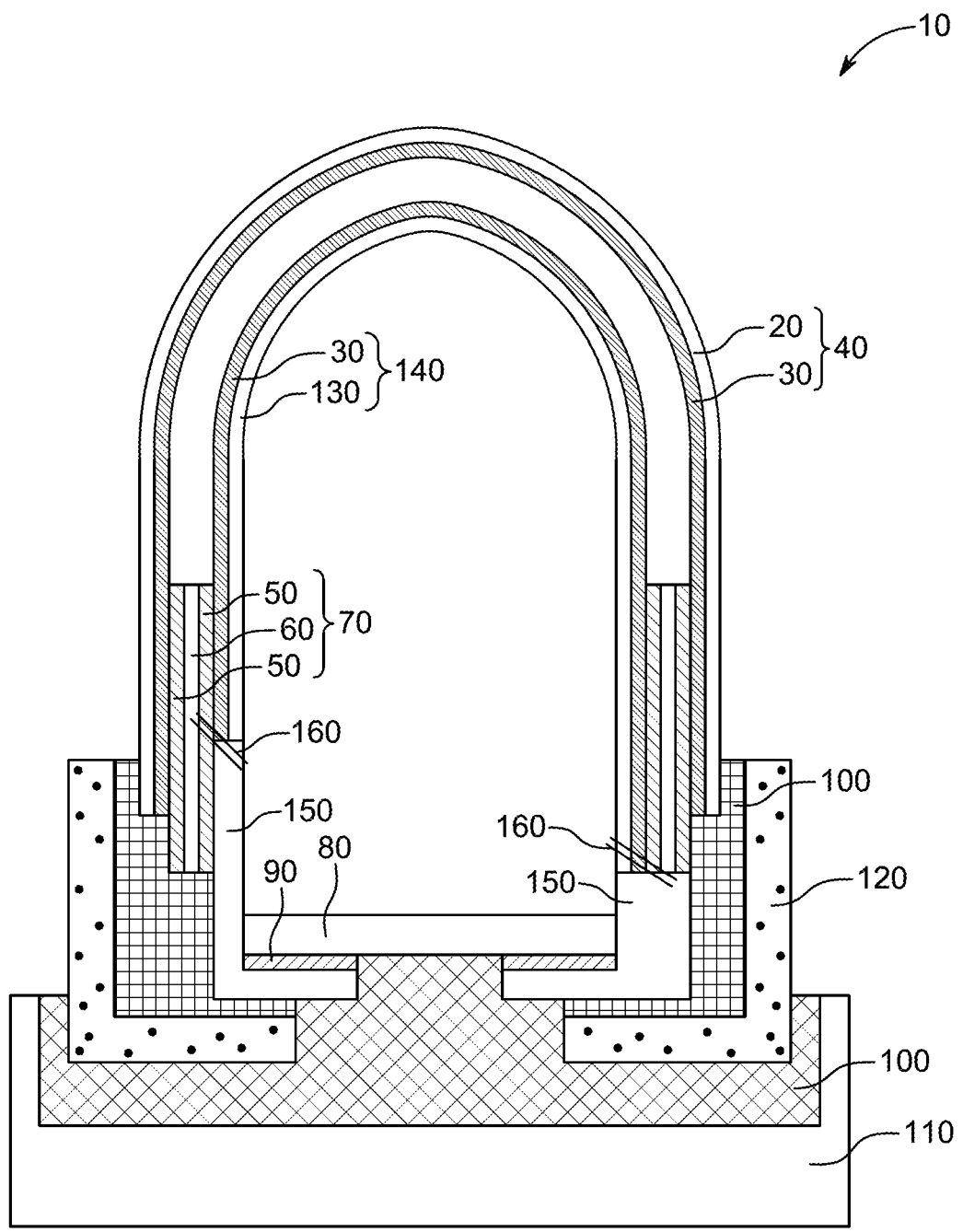
FIG. 5 is a cross-sectional view of waterproof footwear article comprising a waterproof bridging tape, a protective layer, a nonwoven material and a liner.

FIG. 5 shows the top end of the waterproof bridging tape 70 attached to the waterproof and water vapour permeable membrane 30 of the upper 40 at the bottom edge of the upper 40. On the left side of FIG. 5 an embodiment is shown in which the footwear article 10 comprises a liner 140. The liner may comprise at least one textile layer, a laminate of a textile layer and a waterproof and water vapour permeable membrane, or a waterproof and water vapour permeable membrane sandwiched between two textile layers as described above.

The bottom end of the liner 140 is attached to the nonwoven material 150 with a seam 160. A waterproof bridging tape 70 comprising a carrier layer 60 and two adhesive layers 50 on opposing surfaces is attached to the waterproof and water vapour permeable membranes 30 of the liner 140 and the upper 40 and has such a length that the waterproof bridging tape 70 covers the seam between the liner 140 and the nonwoven material 150. The bottom end of the nonwoven material 150 is then lasted to the insole 80 with adhesive 90.

On the right hand side of FIG. 5 the bottom ends of both the liner 140 and the waterproof bridging tape 70 are stitched to the nonwoven material 150, preferably with the same seam. The nonwoven material 150 is then lasted to the insole 80. In a further embodiment not pictured, the nonwoven material 150 may be attached to the bottom end of the upper 40 with a seam. The waterproof bridging tape 70 comprising a carrier layer 60 and one layer of adhesive 50 is then glued over the seam 160 on the inside of the upper 40 and then lasted together with the nonwoven material 150 to the insole 80 with adhesive 90.

Alternatively, instead of lasting the nonwoven material 150 and/or the waterproof bridging tape 70 to the insole 80, the nonwoven material 150 and/or the waterproof bridging tape 70 may be attached to the insole 80 with a seam.

The nonwoven material preferably has a fabric weight of at least 150 g/m$^2$, at least 200 g/m$^2$ or at least 250 g/m$^2$. Any nonwoven materials such as staple, melt-blown or spunlaid nonwovens may be used. The nonwoven materials may comprise any fibres or filaments commonly used in footwear. Processes such as thermal bonding, hydroentanglement, needle punching, melt-blowing or chemical bonding provide sufficient mechanical resistance in the nonwoven materials. The nonwovens may be made from synthetic or natural polymers. Suitable synthetic polymers may be selected from polyester (PE), polyacrylonitrile (PAN), polyamide (PA), and polyethylene (PE).

Further shown in FIG. 5 is a protective layer 120 which is glued to the bottom end of the upper 40. The bottom perimeter edge of the protective layer 120 is lasted on the outside facing surface of the nonwoven material 150. The sole 110 can either be attached by cementing or by direct injection of the sole polymeric material. In that way, there is a seal formed between the sole cement 100 or the injected polymer material of the sole, the protective layer 120 and the waterproof bridging tape 70.

Figure 6:
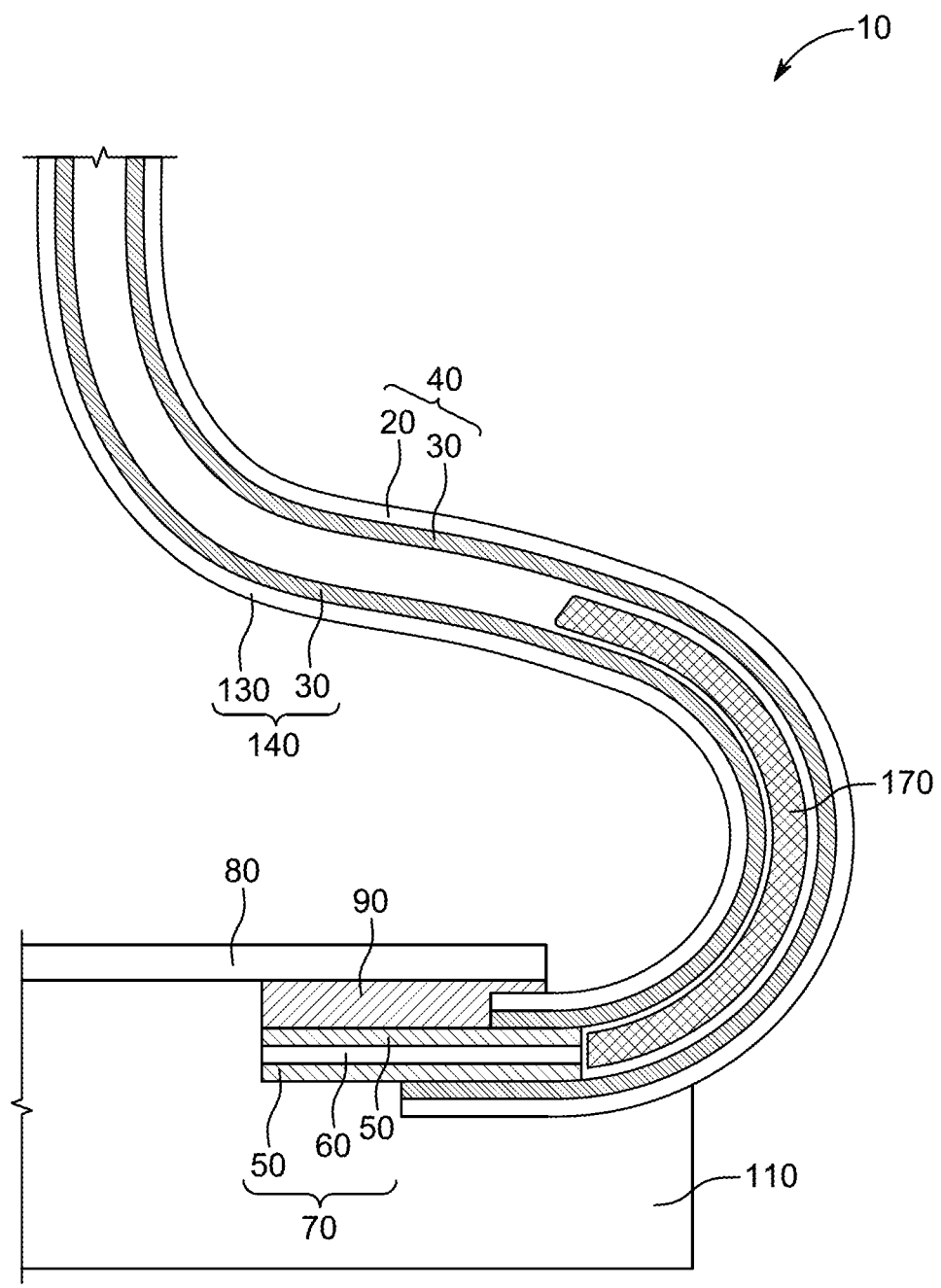
FIG. 6 is a cross-sectional view of a toe area of a footwear article comprising a waterproof bridging tape, a protective toe cap and a liner.

The waterproof and water vapour permeable footwear article 10 of FIG. 6, in a further embodiment, shows the toe region of a waterproof and water vapour permeable footwear article 10 comprising an upper 40, an insole 80, a sole 110, a waterproof bridging tape 70, a liner 140, and a protective toe cap 170. A protective toe cap 170 must overlap with the insole 80 to provide sufficient protection for the wearer. The protective toe cap 170 is preferably made from metal. The protective toe cap 170 may be attached to the waterproof and water vapour permeable membrane 30 of the upper 40. Preferably the protective toe cap is positioned between the upper 40 and the liner 140. The waterproof bridging tape 70 is required to provide a seal between the two membranes 30 and the sole 110. The waterproof bridging tape 70 is attached to the bottom perimeter of the waterproof and water vapour permeable membrane 30 of the upper 40 and extends beyond the upper 40. Preferably, the waterproof bridging tape 70 comprises two adhesive layers 50 on opposing surfaces. The upper 40, the lining 140 and the waterproof bridging tape 70 are lasted to an insole 80 with lasting adhesive 90.

The bottom end of the liner 140 is attached to the waterproof bridging tape 70 such that the top edge of the waterproof bridging tape 70 is sandwiched between the liner 140 and the upper 40. The waterproof bridging tape 70 extends beyond the bottom edge of the upper 40 and the liner 140. The bottom edge of the upper 40 preferably extends beyond the bottom edge of the liner 140. A sole 110 is then injected or cemented (not shown). As discussed with the previous embodiments the upper 40 or the liner 140 can be made of different laminates which are discussed above.

Figure 7:
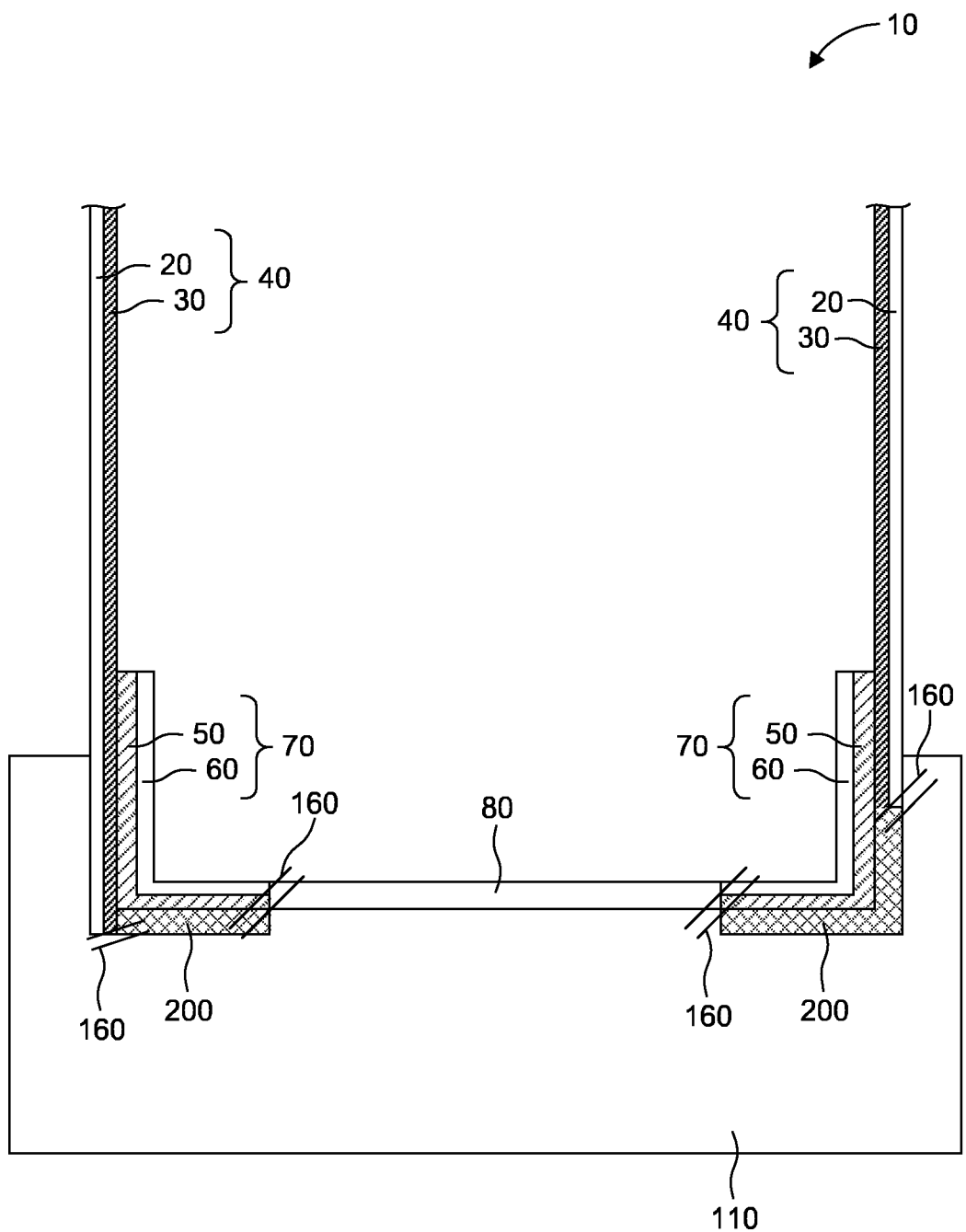
FIG. 7 is a cross-sectional view of a waterproof footwear article comprising a waterproof bridging tape and a net band.

FIG. 7 shows two embodiments, one on each side. For both embodiments a net band 200 is attached with a seam 160 to the bottom end of the upper 40. The waterproof bridging tape 70 is then attached, for example by heat pressing, over the inside facing surface of the net band 70, the seam 160 between the net band 70 and the upper 40 and covering part of the inside surface of the upper 40. The edge of the bridging tape 70 and the edge of the net band 200 which is not sewn to the upper 40 are coterminous. This means that neither the bridging tape 70 nor the net band 200 extend beyond the other for this edge. This edge is attached to a strobel board 80 with a strobel seam 160. Waterproof sole material 110 is then injected over the bottom of the footwear article. The liquid sole material will then flow through the net band 200 towards the seams 160 and together with the waterproof and water vapour permeable membrane 30 render the footwear article 10 waterproof.

The difference between the two embodiments shown in FIG. 7 on the left and right side is whether or not the net band 200 extends only horizontally or also vertically. In the embodiment on the right side, the net band 200 is used for lasting together with the bridging tape 70. The net band 200 is attached to the bridging tape 70 along its full length by the adhesive layer 50 of the bridging tape. This may provide additional strength to the net band 200 for lasting. Thus, the net band 200 extends horizontally and vertically. In the embodiment on the left side of the FIG. 7 the net band 200 only extends horizontally bridging the gap between the upper 40 and the strobel board 80.

For both embodiments, the injected sole material overlaps the seam 160 between the upper 70 and the net band 200 on the outside of the footwear article 10.

The present invention has been described according to preferred embodiments, but equivalents and variants are possible without departing from the scope of the appended claims.

What is claimed is:

1. A waterproof and water vapour permeable footwear article comprising
    an upper,
    an insole,
    a sole, and
    a waterproof bridging tape;
wherein the upper comprises an outer material and a waterproof and water vapour permeable membrane, and wherein the waterproof and water vapour permeable membrane is laminated to a surface of the outer material facing the inside of the footwear article, wherein at least a top end of the waterproof bridging tape is attached to the waterproof and water vapour permeable membrane of the upper at a bottom perimeter edge of the upper on a surface of the waterproof and water vapour permeable membrane that faces the inside of the footwear article, and wherein the waterproof and water vapour permeable membrane is present in the total length of the upper.

2. The waterproof and water vapour permeable footwear article of claim 1, wherein the waterproof bridging tape comprises a waterproof carrier layer which is covered on at least one surface by an adhesive layer.

3. The waterproof and water vapour permeable footwear article of claim 1, wherein at least a bottom end of the waterproof bridging tape is attached to the insole.

4. The waterproof and water vapour permeable footwear article of claim 3, wherein the waterproof bridging tape is attached to the insole with a seam or wherein the waterproof bridging tape is attached to the insole with adhesive.

5. The waterproof and water vapour permeable footwear article of claim 1, wherein the insole is a lasting board or a strobel board.

6. The waterproof and water vapour permeable footwear article of claim 1, wherein the upper further comprises a backing layer laminated to the surface of the waterproof and water vapour permeable membrane that faces the inside of the footwear article.

7. The waterproof and water vapour permeable footwear article of claim 6, wherein the backing layer is a textile layer or an open mesh material.

8. The waterproof and water vapour permeable footwear article of claim 1, wherein the waterproof bridging tape comprises a carrier layer which is covered on both opposing surfaces with an adhesive layer.

9. The waterproof and water vapour permeable footwear article of claim 1, wherein a bottom end of the waterproof bridging tape is attached to a nonwoven material.

10. The waterproof and water vapour permeable footwear article of claim 9, wherein the waterproof bridging tape is attached to the nonwoven material by a seam.

11. The waterproof and water vapour permeable footwear article of claim 1, further comprising a protective layer a portion of which is located on the outside of the footwear article.

12. The waterproof and water vapour permeable footwear article of claim 11, wherein the protective layer is a rubber layer or a polyurethane layer.

13. The waterproof and water vapour permeable footwear article of claim 1, further comprising a liner.

14. The waterproof and water vapour permeable footwear article of claim 13, wherein the liner forms a bootie.

15. A method of manufacturing the waterproof and water vapour permeable footwear article of claim 1, the method comprising:
    providing the upper having the outer material and the waterproof and water vapour permeable membrane laminated to the surface of the outer material facing the inside of the footwear article, the insole, the sole and the waterproof bridging tape,
    attaching the top end of the waterproof bridging tape to the waterproof and water vapour permeable membrane of the upper at the bottom perimeter edge of the upper on the surface of the waterproof and water vapour permeable membrane that faces the inside of the footwear article.

16. The method of claim 15, further comprising attaching a bottom end of the waterproof bridging tape to the insole.

* * * * *